United States Patent [19]

Schroder et al.

[11] Patent Number: 5,189,581
[45] Date of Patent: Feb. 23, 1993

[54] DRYING MECHANISMS AND METHODS FOR REMOVING EXCESS MOISTURE FROM ELECTRONIC EQUIPMENT

[76] Inventors: Robert L. Schroder, P.O. Box 593; Willard B. Moffitt, 1286 Wildwood La., both of Anacortes, Wash. 98221

[21] Appl. No.: 673,940

[22] Filed: Mar. 22, 1991

[51] Int. Cl.⁵ .................................................. G11B 23/04
[52] U.S. Cl. ........................................ 360/128; 206/204; 360/137
[58] Field of Search ............... 360/128, 137, 99.02, 360/99.03; 206/204; 236/44 R

[56] References Cited

U.S. PATENT DOCUMENTS

| | | | |
|---|---|---|---|
| 3,990,872 | 11/1976 | Cullen | 55/274 |
| 4,594,082 | 6/1986 | Catherwood, Sr. | 55/316 |
| 4,594,629 | 6/1986 | d'Alayer de Costemore d'Arc | 360/128 |
| 4,599,670 | 7/1986 | Bolton | 360/137 |
| 4,620,248 | 10/1986 | Gitzendanner | 360/97 |
| 4,642,715 | 2/1987 | Ende | 360/97.02 |
| 4,684,510 | 8/1987 | Harkins | 360/97.02 |
| 4,747,960 | 5/1988 | Freeman et al. | 210/689 |
| 4,831,475 | 5/1989 | Kakuda et al. | 360/97.03 |
| 4,863,499 | 9/1989 | Osendorf | 360/97.02 |

FOREIGN PATENT DOCUMENTS 0009916  1/1979  Japan ............................ 360/128

Primary Examiner—David J. Severin
Attorney, Agent, or Firm—Hughes & Multer

[57] ABSTRACT

The specification disclosed a drying apparatus for removing excess moisture from a housing of a video cassette camera recorder comprising: a hollow casing having at least one passageway formed therein; desiccant material inside the casing; and a screen for covering the at least one passageway to prevent the desiccant material from passing through the passageway while allowing moisture to pass therethrough. The configuration of the casing corresponds to the general shape of a video tape container that may be inserted into an orifice in the housing designed to receive such containers. Recesses and contact surfaces are preferably formed at strategic locations on the casing to accommodate mechanical parts of the video camera and trigger sensors designed to monitor the presence and condition of a video tape container within the housing.

28 Claims, 2 Drawing Sheets

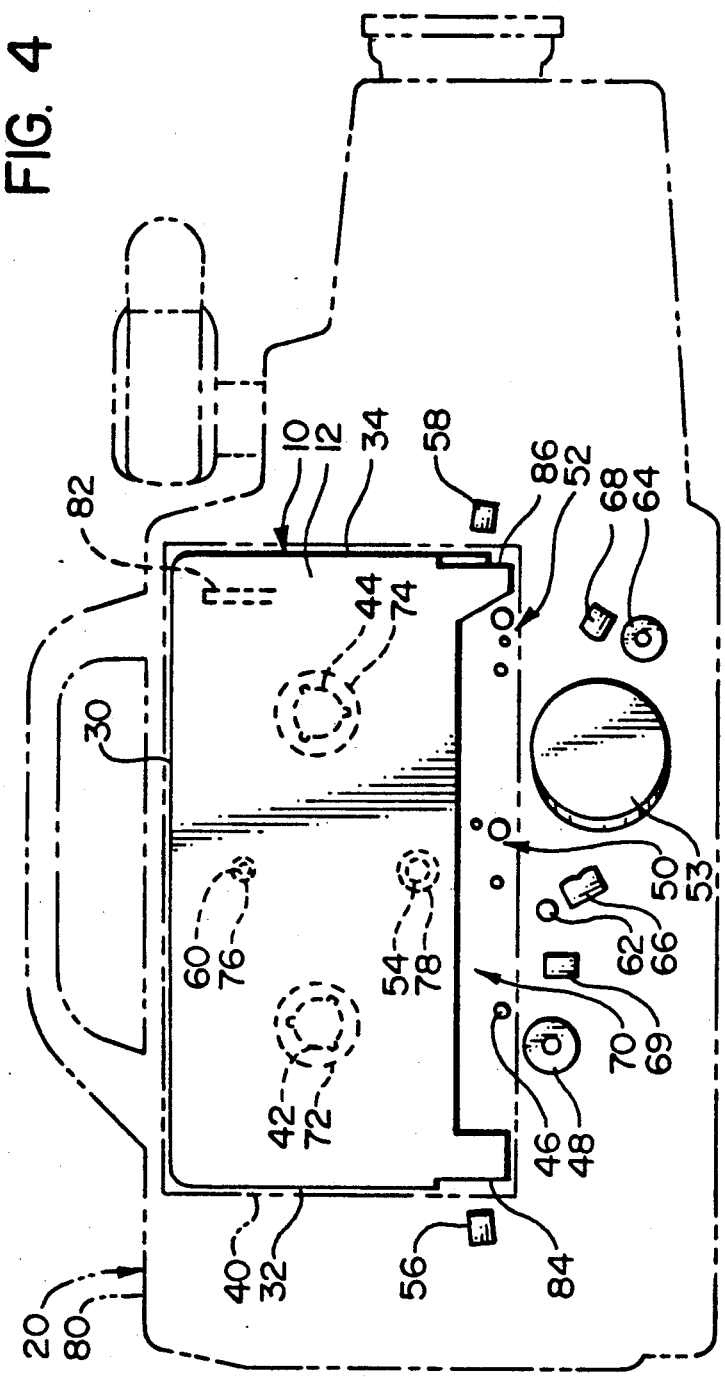

DRYING MECHANISMS AND METHODS FOR REMOVING EXCESS MOISTURE FROM ELECTRONIC EQUIPMENT

TECHNICAL FIELD

The present invention relates to novel, improved drying mechanisms and methods for drying the air within electronic equipment and, more specifically, to drying mechanisms that allow moisture to be removed from the air in the interior of portable electronic equipment such as video cassette recorders having a compartment for receiving a container such as a video cassette tape.

BACKGROUND OF THE INVENTION

Electronic equipment normally has a given range of acceptable environmental conditions, such as temperature and humidity, within which the equipment will properly function. These ranges are determined by the design parameters of the components of the electronic equipment and the manufacturing techniques used to assemble the components into a finished product. When the environmental conditions within a housing of the electronic equipment are outside these acceptable ranges, the equipment may malfunction and is susceptible to damage. Further, the lighter and smaller electronic apparatus become, the more susceptible they are to the adverse effects of climatic conditions because they are more likely to be used in environments where climatic conditions are not controlled.

To prevent malfunctioning of or damage to electronic equipment, equipment designers often take steps to control the environmental conditions within the housing of the electrical equipment. Such devices as fans for cooling the electronic components or dehumidifiers for extracting moisture from the air within the housing may be provided within the housing to control the conditions in the housing. However, in many pieces of electronic apparatus, especially in consumer electronics such as hand held video cassette recorders, size and weight constraints prevent the inclusion of such devices within the housing of the electronic equipment.

In cases where it is impractical to control the environment within the electronic equipment housing, equipment designers often provide sensors for determining whether environmental conditions are outside of acceptable ranges. These sensors are electronically coupled with shut-off switches that prevent the operation of the electronic equipment when environmental conditions are unacceptable. Such sensors and switches may also be employed in conjunction with devices designed to control the environmental conditions within the housing. These sensors and interlocks prevent improper operation of and damage to the electronic equipment.

The above-described problems are particularly acute in the field of video tape camera recorders. Therefore, the present invention is particularly suited to use with video cameras and will be discussed below as it applies to such cameras. However, the following discussion of this application of the present invention should not be construed as limiting the present invention to use with video cameras. As examples, electronic equipment such as portable computers and portable audio tape players and recorders may also be susceptible to problems that can be solved by devices that come within the broader scope of the present invention.

Video tape camera recorders are often portable and are thus taken from the relatively controlled environment of the home for use out-of-doors and in other conditions that may be hostile to the camera components. For example, if such a camera is removed from the warm interior of a car into a cold environment, condensation may form on the inside of the camera.

Because these video cameras are designed to be hand-held and thus must be small in size and lightweight, fans and de-humidifiers may not be included within the housings thereof. Video camera designers thus employ sensors to determine, for example, the humidity within the housing of the video camera. These sensors generally comprise a resister whose resistance varies in a known fashion with different levels of humidity. By monitoring the voltage across and/or the current passing through such a resister, the humidity level within the video camera can be monitored. When the humidity level thus measured exceeds a predetermined value, a switch is triggered which inhibits the operation of the video camera. A message may also be displayed on the camera's monitor indicating that the camera is wet.

While this approach is acceptable at protecting the video camera from damage, the video camera is rendered inoperative for as long as the humidity within the housing exceeds the predetermined amount. During this drying time, the video camera operator may miss the opportunity to record important, transitory events.

As additional background, it should be noted that designers of video cameras do not take into consideration, or make design decisions in support of, any attempts by third parties to design products for the care, maintenance, and improved operation of these cameras. A dichotomy thus exists between camera designers who design cameras to be light-weight, compact, and inexpensive to manufacture and third parties whose design goals are to optimize the performance of these cameras.

PRIOR ART

To reduce the time that it takes for the air inside the camera housing to dry, camera operators have been known to introduce packets or envelopes of silica gel into the camera housing through the opening that receives the video cassette. If the door to the cassette opening is left open while the packet is in the video cassette slot, the effectiveness of the silica gel at absorbing the water within the camera housing is reduced because the packet is exposed to the humidity in the surrounding air. The silica gel absorbs the humidity in the surrounding air as well as the humidity within the camera housing.

If, on the other hand, the door to the cassette opening is closed to prevent the surrounding air from: contacting the silica gel packet, serious damage to the delicate mechanical parts inside the camera housing may result. Numerous guide pins, leaf switches, rollers, and other components protrude into the cavity that is designed to contain the tape cassette. To reduce the overall weight and size of the camera, these parts are made of light-weight material and packed closely together. When the door is closed, the silica gel packet may become pinched between any of these parts and/or the camera housing, resulting in the bending or breaking of the parts. Given the close tolerances inside such cameras, any bending or breaking of these mechanical components is likely to cause permanent damage to the video camera.

Even if the mechanical parts are not damaged, the silica gel packet may be pierced by these parts, allowing the silica gel to spill into the interior of the camera. Again, damage to the video camera will likely result.

Should the silica gel packet be successfully employed to remove moisture from within the camera, the camera operator has no indication of when the moisture is sufficiently removed to allow normal camera operation. Either the operator waits too long before inserting a tape cassette, thereby unnecessarily delaying operation of the camera, or the operator inserts the tape cassette before the air within the housing is sufficiently dry. If the air is not dry enough, the tape cassette must be removed and silica gel packet re-inserted, resulting in further delay in the normal operation of the camera.

A search of the prior art literature developed the following U.S. Pat. Nos.:

3,990,872 issued Nov. 9, 1976 to Cullen. Cullen discloses an absorbent package much like the silica gel packets described above. The Cullen device is susceptible to the same problems of damage to the mechanical parts of the electronic device inherent in those silica gel packets;

4,594,082 issued June 10, 1986 to Catherwood, Sr. The Catherwood, Sr. device is a filtering apparatus used with a sealed enclosure for mobile electronics gear. This device would not be practical for drying the interior of a camera housing because: (a) it would add too much size and weight to the camera and (b) camera housings are insufficiently sealed for use with such a filtering device;

4,599,670, issued July 8, 1986 to Bolton. The Bolton device is permanently installed in a disk drive so that it absorbs moisture while the disk drive is off and expels moisture to the exterior of the disk drive when the disk drive is operating. The Bolton device is too heavy and bulky for use with electronic devices in which size and weight are critical;

4,620,248, issued Oct. 28, 1986 to Gitzendanner. The Gitzendanner patent disclose providing a vent tube in a disk drive casing to minimize water vapor diffusion into the disk drive. A heater and desiccant are combined to absorb and expel water vapor. Again, such a device is not practical when size and weight are overriding considerations in design of an electronic device;

4,747,960 issued May 31, 1988 to Freeman et al. The Freeman device is a water absorbent packet for absorbing water in a liquid. This packet is similar in appearance and operation to the silica gel packets described above, and would be susceptible to the same problems of damaging mechanical components and spilling inside of the camera;

4,831,475 issued May 16, 1989 to Kakuda et al. The Kakuda et al patent discloses providing a reversible desiccating agent in the housing of a disk drive. The desiccating agent cyclically absorbs and discharges moisture in response to changes in temperature and humidity. The Kakuda et al device is too bulky and heavy to be used in portable electronics gear; and 4,863,499 issued Sep. 5, 1989 to Osendorf. The Osendorf device comprises a sealed tortuous passage adjacent to a charcoal layer. Fluid such as air passing into a disk drive is passed through this tortuous passage, and moisture is removed from the fluid by the adjacent charcoal layer. The Osendorf device is inappropriate for use with portable electronics gear because: (a) such gear is normally not sealed and (b) the Osendorf device is too large and heavy to be included in such gear.

OBJECTS OF THE INVENTION

From the foregoing, it should be apparent that one important object of the present invention is to provide apparatus and methods for removing moisture from portable video tape camera recorders.

Other important, but more specific, objectives of the present invention are to provide moisture removing apparatus and methods that:

do not add weight or size to portable video cameras;

significantly decrease the time required to dry the air within the housing of such cameras;

prevent damage to delicate mechanical parts inside portable video cameras;

optimize the performance of video cameras;

allow the operator to determine the status of the desiccant employed to absorb moisture from within the electronic equipment; and allow the video camera to be operated to determine whether the air within is sufficiently dry for safe operation of the equipment.

SUMMARY OF THE INVENTION

The above and other objects are achieved by a drying apparatus for removing excess moisture from a housing of a video camera comprising: a hollow casing having at least one passageway formed therein that allows communication between the interior of the hollow casing and the interior of the housing; desiccant material inside the container; and means for covering the at least one passageway to prevent the desiccant material from passing through the passageway while allowing moisture to pass therethrough. The video cassette camera recorder has an orifice through which a video tape cassette may be inserted into a cassette cavity. The casing configuration corresponds to the general shape of the video tape cassette so that it may be inserted into the cassette cavity.

Additionally, recesses and contact surfaces are preferably formed at strategic locations on the casing. The recesses accommodate mechanical parts of the video camera, such as extraction pins, electromagnetic emitters, hub rotators, and rotation sensing pins, to ensure that these mechanical parts are not damaged when the casing is inserted into the orifice. The contact surfaces trigger sensors designed to monitor the presence and condition of a container within the housing so that the sensors determine that a container is present and in good condition.

The passageways may be covered by a fine-mesh screen which allows moisture-laden air to pass into the desiccant within the casing while preventing the desiccant from passing through the passageway. These passageways are preferably located on opposing surfaces of the casing to improve air flow into the casing. Optional sealing means may be provided for sealing the passageways when the casing is not in use to prevent the desiccant from unnecessarily becoming saturated with water.

The casing is optionally formed from clear plastic and indicating silica gel may be used as a desiccant. The clear plastic casing allows the color of the indicating silica gel to be monitored to determine whether the silica gel has become saturated with water.

The present invention thus allows operation of the video camera to be optimized by quick drying of the interior thereof despite the varieties and design complexity of modern video cameras.

BRIEF DESCRIPTION OF THE DRAWING

FIG. 4 is a schematic view of a video camera illustrating the relationship between the various recesses and surfaces formed on the present invention and the various pins, sensors, and other mechanical parts of the video camera.

DETAILED DESCRIPTION OF THE PREFERRED EMBODIMENT

Figure 2:
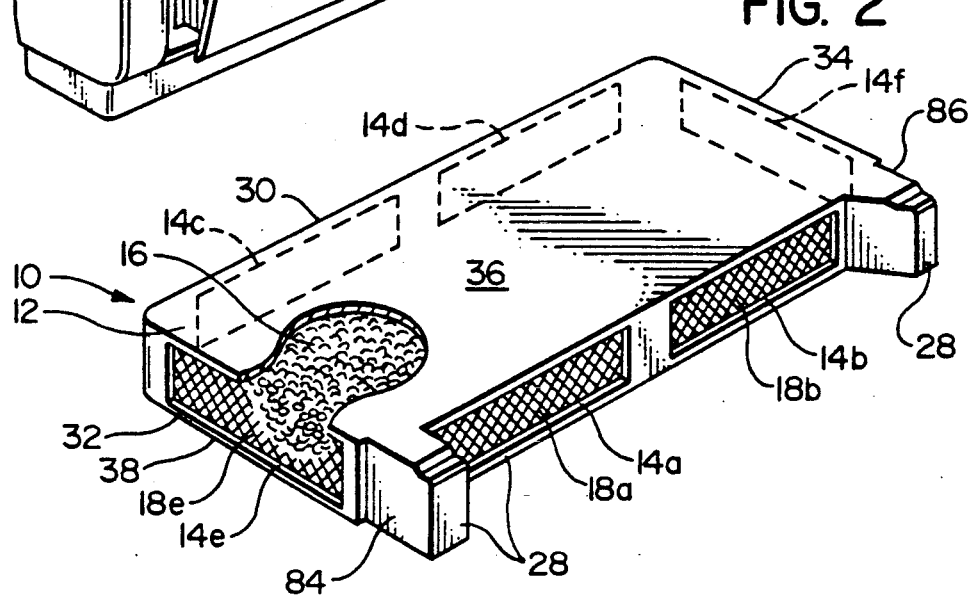
FIG. 2 is a perspective, cut-away view of the present invention schematically indicating the placement of the passageways into which air may flow.
Figure 3:
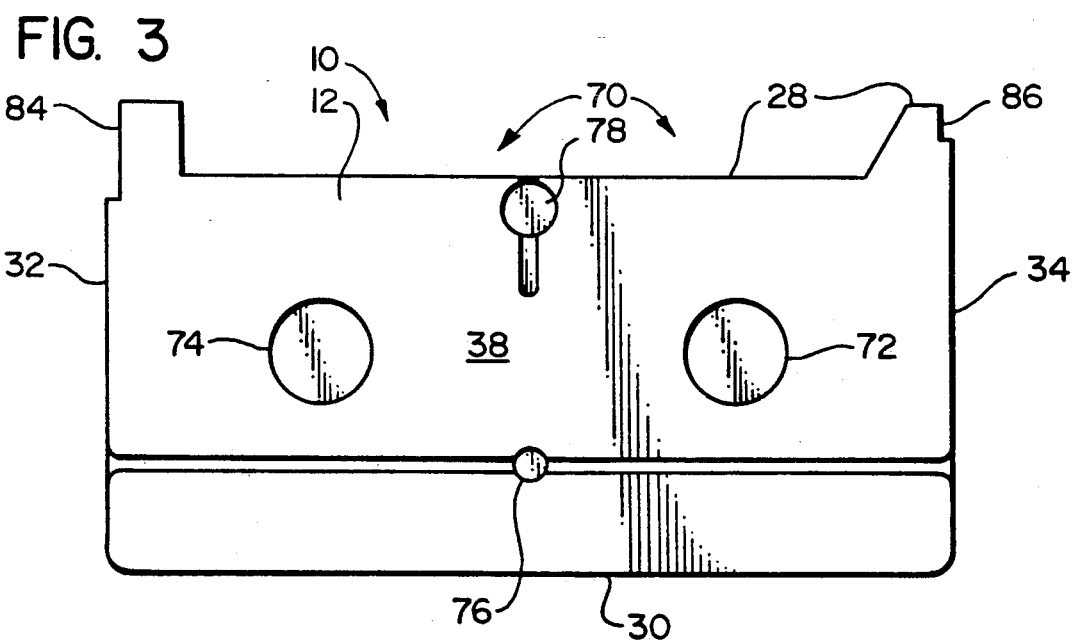
FIG. 3 is a bottom view of the present invention depicting the various recesses and surfaces formed thereon.

Referring now to the drawing, FIG. 2 depicts a drying apparatus 10 constructed in accordance with, and embodying, the principles of the present invention. The drying apparatus 10 generally comprises a hollow casing 12 having passageways 14 formed therein, desiccant 16 stored within the casing 12, and screens 18 covering each of the passageways 14.

Figure 1:
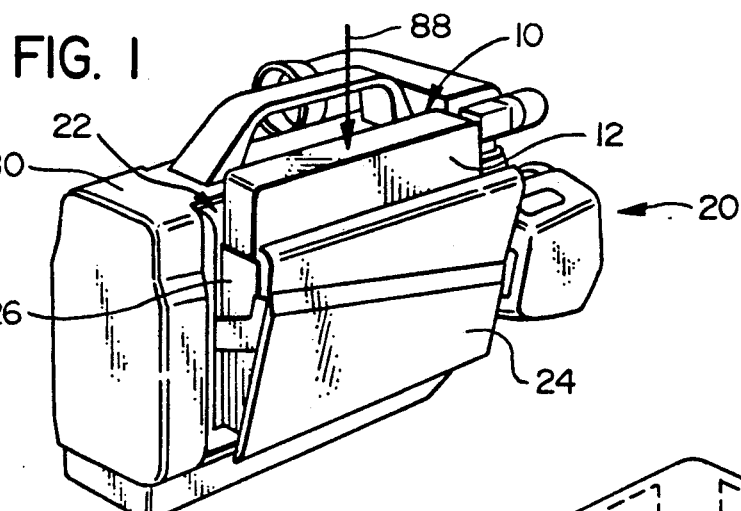
FIG. 1 is a perspective view of a drying apparatus of the present invention being inserted into a video tape camera recorder.

The drying apparatus of the preferred embodiment is designed to remove the moisture from the interior of a video tape camera recorder 20 (FIG. 1). This video camera 20 is well-known and not in itself part of the present invention. Accordingly, the camera 20 will be described herein only to the extent necessary for a complete understanding of the present invention.

The video camera 20 contains an orifice 22 into which a video tape cassette may be inserted. This orifice 22 may be selectively closed by a door 24, which is shown in its open position in FIG. 1. A video tape cassette is loaded into the camera 20 by inserting the tape into a bracket 26 integrally formed on the inner surface of the door 24 and then manually closing the door 24. A video tape cassette is removed by pressing an EJECT button located on a control panel of the camera 20. Pressing the EJECT button causes the door 24 to open, after which the cassette may be manually extracted from the bracket 26.

The height, depth, and width of the video tape cassette received within the orifice 22 are determined according to the recording format of the video camera 20. Each recording format, such as VHS, BETA, and 8 mm, has a one or more standard sizes of video tape cassette, as well as the video tape stored within the cassette.

The casing 12 is designed to be in the general shape of a video tape cassette of the type that may be received within the camera 20. More specifically, the casing 12 is generally shaped like a rectangular box. The casing 12 has front and back sides 28 and 30, left and right sides 32 and 34, and top and bottom sides 36 and 38. The distances between the front and back, left and right, and top and bottom sides are determined by the depth, width, and height, respectively, of a video tape cassette of the particular recording format of video camera 20. For example, if the camera 20 records in VHS format, the casing 12 will have the following parameters: 4" from front side 28 to back side 30 (depth); 7⅜" from left side 32 to right side 34 (width); and 31/32" from top side 36 to bottom side 38 (height).

A cassette cavity is defined within the video camera 20 generally corresponding to, but slightly larger than, the dimensions of the format of video tape cassette received within orifice 22. This cavity is schematically indicated by dotted lines at reference character 40 in FIG. 4. The cassette cavity 40 is a three-dimensional space having a height, depth, and width slightly larger than the overall dimensions of a standard video tape cassette for the recording format of camera 20.

Various mechanical parts of the video camera 20 protrude or extend into cassette cavity 40. The casing 12 has recesses formed at strategic points thereon that receive these mechanical parts.

The camera dried by the drying apparatus of preferred embodiment has the following mechanical parts (schematically indicated in FIG. 4) which extend into the cassette cavity 40:

(a) rewind and fast forward hub rotators 42 and 44 which are designed to engage and rotate the hubs of a video tape cassette;

(b) a capstan 46 and pinch roller 48 between which the video tape is pinched to translate rotational movement of the capstan 46 into a lateral translation of the video tape;

(c) first and second tape retraction groups 50 and 52 which retract the video tape (downwardly in FIG. 4) until the tape partially surrounds a rotating-head drum 53;

(d) an infra-red emitter 54 that emits an infra-red signal for receipt by infra-red detectors 56 and 58, as will be discussed in further detail below; and (e) a rotation monitoring pin 60 which monitors the rotation of the two hubs of the video tape cassette.

Further depicted in FIG. 4 are guide rollers 62 and 64, playback/record head 66, and erase head 68. A resistor 69, which changes resistance in a manner that corresponds to the amount of moisture in the air, is also shown in FIG. 4. The voltage across and/or current through this resistor 69 is monitored to determine whether the moisture in the air is excessive.

It should be noted at this point that FIG. 4 is merely a representation of the internal construction of one video cassette camera recorder. Such recorders are manufactured by many different manufacturers, and each manufacture uses internal constructions that may differ from that depicted in FIG. 4. However, the basic principles of video camera construction, which remain constant, are represented in FIG. 4.

The outline of the casing 12 is modified with recesses for these mechanical components that extend into the cassette cavity 40. Specifically, an extraction cavity 70 is formed along a substantial portion of the middle of front side 28. This extraction cavity 70 begins at most 11/16" from the left side 32 and ends at most 11/16" from the right side 34. This cavity 70 extends at least ⅝ in from the plane that includes front edge 28. The cavity 70 allows the first and second extraction groups 50 and 52, the capstan 46, and pinch roller 48 to extend into the cassette cavity 40 without contacting the casing 12. The casing 12 thus does not contact and bend or break these mechanical components.

Additionally, hub recesses 72 and 74 are formed on the bottom the casing 12. These hub recesses 72 and 74 accommodate the hub rotators 42 and 44, respectively, so that the casing does not contact and damage the hub rotators 42 and 44. These cavities are generally cylindrical, with the diameter of the cylinder being at least 1 1/16". The round opening of the hub recess 74 is centered approximately 1¾ from the right side 32 and 2 3/32" from the plane including the front side 28, while the hub recess 72 is centered approximately 1¾" from the left side 34 and 2 3/32" from the plane including the front side 28.

The rotation monitoring pin 60, which is employed to monitor the rotation of hub rotators 42 and 44, is similarly accommodated by a rotation pin recess 76 formed on the bottom side 38 of the casing 12. This rotation pin recess is located on a line centered between the hub recesses 72 and 74 and is situated approximately ⅞" from the back side 30.

An emitter recess 78 also is formed on the bottom side 38 of the casing 12. This emitter recess 78 allows the infra-red emitter 54 to protrude into the cassette cavity 40 without being bent or broken. The emitter recess 78 is also situated on a line centered between the hub recesses 72 and 74 and is approximately ⅞" from the plane including the front side 28.

Accordingly, the casing 12 of the present invention is carefully designed to accommodate and protect the delicate mechanical parts found within a typical video cassette camera recorder.

An additional feature of the present invention is that the casing 12 as described allows the video camera to be operated, for at least a short time, in order to determine whether the amount of moisture within the cavity is below acceptable levels.

The housing 80 of the video camera 20 contains several sensors for determining the presence and status of the video cassette tape contained therein. For example, indicated by reference character 82 is a leaf switch for determining whether a tape is present within the cassette cavity 40. If no tape is present, the leaf switch 82 inhibits operation of the camera 20 to prevent the camera operator from inadvertently operating the camera 20 without a video tape cassette.

Further, the infra-red emitter 54 emits electromagnetic radiation. This radiation is detected by infra-red detectors 56 or 58 when the clear leader at the end of the video tape within the cassette is pulled off of the spools of the cassette. The detectors 56 and 58 generate appropriate signals when the clear end of the video tape is detected. Either of these signals prevents the operation of the video camera 20. The path taken by the infra-red radiation between the infra-red emitter 54 and the infra-red detectors 56 and 58 must therefore be blocked before the camera 20 will operate.

The rotation sensing pin 60 determines whether both of the hubs of the tape cassette are turning while the camera 20 is being operated. After a short delay period, the rotation sensing pin 60 generates a signal that inhibits operation of the camera 20 if both hubs are not turning.

The casing 12 of the preferred embodiment has solid surfaces 84 and 86 located in the radiation path between the emitter 54 and detectors 56 and 58. In addition, the bottom side 38 of the casing 12 contacts a leaf spring 82 to cause the spring 82 to generate an appropriate cassette present signal. In most cases, the delay period after which rotation sensor 60 determines whether both hubs are rotating is sufficient for the camera operator to actuate the camera to determine whether enough moisture has been removed from the camera. If the delay period is insufficient for any reason, a mechanism may be placed within the casing 12 which turns both hubs to simulate the action of a standard video tape cassette.

The casing 12 of the present invention thus does not need to be removed in order to test whether the desiccant material has absorbed excess moisture from within the camera housing 80.

The desiccant 16 stored within hollow casing 12 may be any material which absorbs water from moist or humid air. The preferred embodiment employs silica gel in granular or particulate form.

Alternatively, indicating silica gel may be employed as the desiccant material 16. Indicating silica gel changes color from blue to pink as it becomes saturated with water. If such indicating silica gel is employed as a desiccant, the casing may be made at least in part from clear material to enable the operator to view the indicating silica gel contained therein. The operator will thus know when the drying apparatus 12 can no longer absorb moisture.

The screens 18 may be formed from any material that prevents the desiccant 16 from passing through the passageways 16 while allowing moisture and moisture-laden air to pass therethrough. A plastic, metal, or cloth screen having fine-mesh holes formed therein is preferably employed. The mesh should be slightly smaller than the effective diameter of the smallest expected particles of silica gel. In the preferred embodiment, a plastic screen having a mesh of 18 is employed.

The passageways 14 are formed along the front, back, left, and right sides 28, 30, 32, and 34. This arrangement allows for reduced manufacturing costs of the drying apparatus 12. One or two passageways may be formed on each side, depending upon the length of the side. With this arrangement, passageways 14a and 14b on the front side 28 oppose passageways 14c and 14d on the back side 30. Similarly, any passageways on the left side 32 oppose those on the right side 34. Such opposing passageways increase the effectiveness of the absorbing properties of the desiccant material by optimally channeling moisture-laden air into the center of the casing 12.

The drying apparatus 10 as described above is employed to remove the moisture from the housing 80 of the camera 20 as follows. The drying apparatus 10 is inserted and removed in a manner similar to the insertion and removal process described above for the standard video tape cassette. Specifically, the drying apparatus 10 is inserted in the direction shown by arrow 88 into the bracket 30 with the front side 28 of the casing 12 down and the bottom side 38 thereof facing the camera 20. The door 24 is then closed. The desiccant material 16 immediately begins absorbing moisture from the interior of camera housing 80.

To determine when sufficient moisture has been removed to allow the camera to operate, the PLAY or RECORD button on the video camera 20 is pressed. Because the casing 12 has activated the appropriate sensors, the operator will hear the motor of the camera 20 operate if the moisture is below acceptable levels. The motor will operate for a short time until the rotation sensor 60 determines that the cassette hubs are not rotating and prevents operation of the camera 20. The video camera 20 has, however, operated for a sufficient period of time to allow the operator to determine that the excess moisture has been absorbed. Further, if the machine is one of the type that displays a message on its viewer indicating that it is wet, this message should be absent. Thus, by looking into the camera's viewer, the operator will have an additional indication that the moisture level within the camera is no longer excessive.

If the moisture within the housing 80 is still excessive, however, the camera motor will not operate even for the short period of time and/or the message indicating that the camera is wet will be displayed. The operator therefore knows to leave the absorbing apparatus in the housing 80.

It has been found that the present invention reduces the drying time for a video camera to about one third of the drying time without a drying device.

The operator presses the EJECT button when the excess moisture has been removed. Pressing the EJECT button causes the door 24 to move into the open position shown in FIG. 1. The drying apparatus 10 may then be manually removed and a standard video tape cassette inserted as above-described. The video camera 20 is thus ready for recording or playback.

If left exposed to the ambient air, the desiccant will absorb moisture after it is removed from the video camera 20. To prevent the desiccant from unnecessarily becoming saturated with water, a flexible lid may be provided for covering the passageways 14 when the drying apparatus 10 is not in use. Alternatively, the entire drying apparatus may be placed into an air-tight container such as a sealable plastic bag. Any method of inhibiting the passage of moisture through passageways 14 is acceptable.

From the foregoing, it is apparent that the present invention is particularly useful when employed to remove moisture from the interior of a video camera. Another important use of the present invention is to leave the drying apparatus 10 in the video camera 20 at all times if the camera 20 is to be stored in a boat, beach cabin, or other location where the ambient humidity is high. The drying apparatus continues to absorb moisture within the camera housing 80 that could corrode the components of the camera 20.

It is clear that the invention may be embodied in forms other than disclosed above without departing from the spirit or essential characteristics of the invention. For example, within its broadest aspects, the present invention may be employed to remove moisture from the interior of a portable or laptop computer or an audio cassette player. In these cases, the casing 12 may be made in the form of a diskette or audio tape as appropriate. Recesses and surfaces would be provided on such a diskette or audio tape shaped casing to accommodate the delicate mechanical parts enclosed within the disk drive or audio tape player.

The above-described preferred embodiment is therefore to be considered in all respects illustrative and not restrictive, the scope of the invention being indicated by the appended claims rather than the foregoing description. All changes that come within the meaning and scope of the claims are intended to be embraced therein.

We claim:

1. A combination of:
   an electronic device having a housing defining at least one orifice through which a container may be inserted and withdrawn, where the container is adapted to hold recording media that may be accessed by the electronic device;
   a hollow casing in the general shape of the container, the casing having at least one passageway formed therein that allows communication between the interior of the hollow casing and the interior of the housing;
   desiccant material inside the casing; and
   means for covering the at least one passageway to prevent the desiccant material from passing through the at least one passageway while allowing moisture to pass therethrough.

2. A moisture removing apparatus as defined in claim 1, in which at least one recess is formed on the casing, where the recess is strategically located on the casing such that at least one part of the electronic device extends into the at least one recess when the casing is inserted into the orifice.

3. A moisture removing apparatus as defined in claim 1, in which the covering means comprises a fine-mesh screen.

4. A moisture removing apparatus as defined in claim 1, in which the electronic device further comprises at least one means for sensing the presence, absence, or condition of a container within the electronic device, and the casing so actuates the sensing means as to cause the sensing means to indicate that a container is present and in operative condition.

5. A moisture removing apparatus as defined in claim 1, in which opposing passageways are formed in the casing to facilitate the flow of air into the desiccant within the casing.

6. A moisture removing apparatus as defined in claim 1, further comprising sealing means for selectively restricting the passage of air through the at least one passageway in the casing.

7. A moisture removing apparatus as defined in claim 1, in which the desiccant is indicating silica gel and the casing is made at least in part of a clear material to allow the color of the indicating silica gel to be monitored.

8. An apparatus for removing excess moisture from inside a housing of a video tape camera recorder having a cassette cavity of a predetermined cavity configuration and at least one orifice through which a video tape cassette having a cassette configuration may be inserted into the cassette cavity, comprising:
   a hollow casing having a casing configuration corresponding to the shape of the cassette configuration, the casing having at least one passageway formed therein that allows communication between the interior of the hollow casing and the cassette cavity;
   desiccant material inside the container; and
   means for covering the at least one passageway to prevent the desiccant material from passing through the passageway allowing moisture to pass therethrough.

9. A moisture removing apparatus as defined in claim 8, in which a extraction recess is formed on the casing to accommodate mechanical devices such as tape extraction pins, pinch rollers, or capstans that protrude into the cassette cavity.

10. A moisture removing apparatus as defined in claim 8, in which an emitter recess is formed in the casing to accommodate an electromagnetic emitter that protrudes into the cassette cavity.

11. A moisture removing apparatus as defined in claim 8, in which:
   hub recesses are formed on the bottom side to accommodate fast forward and rewind hub rotators which extend into the cassette cavity; and
   a rotation recess is formed in the bottom side to accommodate a sensing pin that senses whether hubs on a tape cassette are rotating.

12. A moisture removing apparatus as defined in claim 8, in which:

the video tape camera recorder further comprises at least one means for sensing the presence, absence, or condition of a tape cassette in the cassette cavity; and contact surfaces are so formed at strategic points on the casing as to contact the sensing means and cause the sensing means to indicated that a tape cassette is present and in operative condition.

13. A moisture removing apparatus as defined in claim 8, in which the covering means comprises a fine-mesh screen.

14. A moisture removing apparatus as defined in claim 8, in which opposing passageways are formed in the casing to facilitate the flow of air into the desiccant within the casing.

15. A moisture removing apparatus as defined in claim 8, in which the desiccant is indicating silica gel and the casing is made at least in part of a clear material to allow the color of the indicating silica gel to be monitored.

16. A moisture removing apparatus as defined in claim 8, in which:
the casing has front and back sides, top and bottom sides, and left and right sides;
an extraction recess is formed along a center portion of the front side to accommodate extraction pins which extend into the cassette cavity;
an emitter recess is formed in the bottom side to accommodate an electromagnetic emitter which extends into the cassette cavity;
hub recesses are formed on the bottom side to accommodate fast forward and rewind hub rotators which extend into the cassette cavity;
a rotation recess is formed in the bottom side to accommodate a sensing pin that senses whether hubs on a tape cassette are rotating; and
passageways are formed in the extraction recess on the front side and the back, left, and right sides of the casing to facilitate the flow of air into the desiccant within the casing.

17. A moisture removing apparatus as defined in claim 16, in which:
the video tape camera recorder further comprises at least one means for sensing the presence, absence, or status of a tape cassette in the cassette cavity; and
contact surfaces are so formed at strategic points on the casing as to contact the sensing means and cause the sensing means to indicated that a tape cassette is present in the cassette cavity and in operative condition.

18. A method of removing excess moisture from inside a housing of an electronic device having at least one orifice into which a container may be inserted and withdrawn, where the container is adapted to contain recording media that may be accessed by the electronic device, the method comprising the steps of:
providing a hollow casing filled with desiccant material, the hollow casing being in the general shape of the container and having at least one passageway formed therein that allow communication between the interior of the hollow casing and the interior of the housing, the at least one passageway being covered by a screen to prevent the desiccant material from passing through the passageway while allowing moisture to pass therethrough;
inserting the casing into the orifice in the electronic device until excess moisture has been absorbed by the desiccant material; and
removing the casing when the excess moisture has been absorbed.

19. A moisture removing apparatus as defined in claim 18, further comprising the step of forming at least one recess on the casing such that parts of the electronic device extend into the at least one recess when the casing is inserted into the orifice.

20. A moisture removing method as defined in claim 18 in which the electronic device further comprises means for sensing the presence or absence of a container within the electronic device, further comprising the step of forming a surface on the casing which so actuates the sensing means as to cause the sensing means to indicate that a container is present.

21. A moisture removing apparatus as defined in claim 18, further comprising the step of forming opposing passageways in the casing to facilitate the flow of air into the desiccant within the casing.

22. A moisture removing method as defined in claim 18, further comprising the step of restricting the passage of air through the at least one passageway in the casing when the casing is not inserted into the orifice in the electronic device.

23. A method of removing excess moisture from inside a housing of a video tape camera recorder having a cassette cavity and at least one orifice through which a tape cassette may be inserted into the cassette cavity, comprising the steps of:
providing a hollow casing filled with desiccant material, the hollow casing being in the general shape of a tape cassette and having at least one passageway formed therein that allows communication between the interior of the hollow casing and the cassette cavity, the at least one passageway being covered by a screen to prevent the desiccant material from passing through the passageway while allowing moisture to pass therethrough;
inserting the casing through the orifice into the cassette cavity until excess moisture has been absorbed by the desiccant material; and
removing the casing from the cassette cavity through the orifice when the excess moisture has been absorbed.

24. A mixture removing apparatus as defined in claim in which the casing provided has front and back sides, top and bottom sides, and left and right sides, the method further comprising the steps of:
forming an extraction recess along a center portion of the front side to accommodate extraction pins which extend into the cassette cavity;
forming an emitter recess in the bottom side to accommodate an electromagnetic emitter which extends into the cassette cavity;
forming hub recesses on the bottom side to accommodate fast forward and rewind hub rotators which extend into the cassette cavity;
forming a rotation recess in the bottom side to accommodate a sensing pin that senses whether hubs on a tape cassette are rotating; and
forming the passageways in the extraction recess on the front side and the back, left, and right sides of the casing to facilitate the flow of air into the desiccant within the casing.

25. A moisture removing method as defined in claim 23 in which the electronic device further comprises at least one means for sensing the presence, absence, or condition of a container within the electronic device, further comprising the step of forming a surface on the casing which so actuates the sensing means as to cause the sensing means to indicate that a container is present and in operating condition.

26. A moisture removing method as defined in claim 23, further comprising the step of forming opposing passageways in the casing to facilitate the flow of air into the desiccant within the casing.

27. A moisture removing method as defined in claim 23 further comprising the step of restricting the passage of air through the at least one passageway in the casing when the casing is not inserted into the orifice in the electronic device.

28. A moisture removing method as defined in claim 23, further comprising the step of operating the video camera to determine whether sufficient moisture has been removed from the housing thereof to allow the video camera to operate safely.

* * * * *